United States Patent
Abul-Haj et al.

(10) Patent No.: US 6,310,336 B1
(45) Date of Patent: Oct. 30, 2001

(54) ARCHITECTURE FOR PROCESSING WIDE FIELD-OF VIEW SUN SENSOR SIGNALS FOR SATELLITE APPLICATIONS

(75) Inventors: Cary J. Abul-Haj, Palos Verdes Estates; Thomas R. Parks, Hermosa Beach, both of CA (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 09/150,560

(22) Filed: Sep. 10, 1998

(51) Int. Cl.[7] .............................. B64G 1/36; G01C 21/24
(52) U.S. Cl. .................................. 250/203.4; 250/206.2; 244/171; 701/13
(58) Field of Search .............................. 250/203.4, 203.3, 250/203.1, 203.6, 206.1, 206.2; 356/139.01, 139.02, 141.5, 141.2, 141.1; 244/3.16, 3.18, 164, 168, 171, 172, 173; 701/13, 222

(56) References Cited

U.S. PATENT DOCUMENTS

| | | | |
|---|---|---|---|
| 5,312,071 | * 5/1994 | Flament et al. | 244/168 |
| 5,572,316 | * 11/1996 | Zaffanella et al. | 359/139.01 |
| 5,698,842 | * 12/1997 | Fallon et al. | 250/203.4 |
| 5,745,869 | * 4/1998 | Van Berzooijen | 701/222 |
| 6,047,226 | * 4/2000 | Wu et al. | 701/13 |
| 6,108,593 | * 8/2000 | Didinsky et al. | 701/13 |

* cited by examiner

Primary Examiner—John R. Lee
(74) Attorney, Agent, or Firm—Terle Gudmestad

(57) ABSTRACT

The present invention is embodied in an apparatus for sensing solar position. The apparatus includes a precision wide-field-of-view (WFOV) passive optical sensor head and a set of interface electronics disposed within a spacecraft computer, which is located remotely from the precision WFOV optical sensor head. The interface electronics convert current signals supplied by the precision WFOV optical sensor head into digital signals usable by a spacecraft control processor. The spacecraft control processor uses the digital signals from the interface electronics to precisely determine the attitude of the spacecraft.

4 Claims, 2 Drawing Sheets

ARCHITECTURE FOR PROCESSING WIDE FIELD-OF VIEW SUN SENSOR SIGNALS FOR SATELLITE APPLICATIONS

BACKGROUND OF THE INVENTION (a) Field of the Invention

The present invention pertains to spacecraft attitude sensors and, more particularly, to an architecture for interfacing an attitude sensor to a processing unit.

(b) Description of Related Art

The term attitude is used to describe the orientation of an object with respect to a reference orientation. Attitude is of particular interest in satellite operations. For example, if a satellite is to be used in a communications application, it is necessary that the satellite be oriented in the proper direction to receive and/or transmit relevant information for the communication link. The attitude of a satellite is determined by computations based on the output of attitude sensors located on the satellite. Attitude sensors monitor the position of reference objects, which may include the sun, the earth, constellations, or beacons. For example, a spacecraft may have two sensors, one monitoring the sun and one monitoring the earth. It is well known that given position information from two reference objects (e.g., the sun, the earth, stars, or beacons), it is possible to determine spacecraft attitude.

Commonly, sun sensors include electronics for processing signals representative of solar position. Sun sensor electronics require power connections, telemetry and command (T&C) connections, and connections to transfer the output of the sensor electronics to the spacecraft computer. Typically, each sensor is cross-strapped to redundant spacecraft computers, power buses, and T&C subsystems. Redundant sensors are cross-strapped because of the relatively low reliability of the signal processing electronics in comparison to the other components of the sensor.

In known sensor configurations, a dedicated sensor electronics box may be disposed remote from the sun sensor head. This configuration does not simplify the interface configuration needed to link the sensor electronics box to a power supply and the telemetry system of the spacecraft. A conventional approach is to feed current signals from the sun sensor to a dedicated sensor electronics box that converts the current signals to attitude measurements which are output to the spacecraft computer as digital data. As previously mentioned, power and telemetry signals must also be fed from the spacecraft to the dedicated sensor electronics.

In order to eliminate the need for sensor electronics altogether, some known sun sensor configurations process sensor output signals within the spacecraft computer. However, these configurations still rely on conventional sensor readings which tend to limit overall system precision and accuracy.

SUMMARY OF THE INVENTION

The present invention is embodied in an apparatus for sensing solar position. The apparatus includes a precision wide-field-of-view (WFOV) sensor head having only passive components, a computer, a set of interface electronics disposed within the computer, and a wiring harness connecting the precision WFOV sensor head to the interface electronics.

The invention itself, together with further objects and attendant advantages, will best be understood by reference to the following detailed description, taken in conjunction with the accompanying drawings.

DESCRIPTION OF THE PREFERRED EMBODIMENTS

Precision sun sensors provide a very accurate (typically having ±0.1° resolution) representation of the location of the sun with respect to the spacecraft. Precision sun sensors are mounted in known orientations on the spacecraft frame, and because the sensors can measure the location of the sun, it is possible to determine the attitude of the spacecraft with respect to the sun using a sun sensor. It is desirable for precision sun sensors to have a wide-field-of-view (WFOV). WFOV sun sensors enable sun tracking for a greater percentage of a twenty-four hour period than traditional sun sensors, this is due to the increased field of view of the sensor. Sun sensors typically include photovoltaic cells disposed behind reticle assemblies having outputs directly proportional to the intensity of light to which the cell is exposed. A reticle assembly includes two glass plates separated by a spacer. Masking on the top plate provides an aperture for incoming sunlight. In combination with masking on the bottom plate, the top plate produces a characteristic output pattern of a cell as a function of sun position. For example, to measure solar position with respect to a single spacecraft axis, a number of solar cells may be disposed behind three separate reticles. Two of the reticles may provide coarse solar position information and the third reticle may provide fine solar position information. Note that a second set of three reticles may be used to measure solar position with respect to a second axis of the spacecraft.

Figure 1:
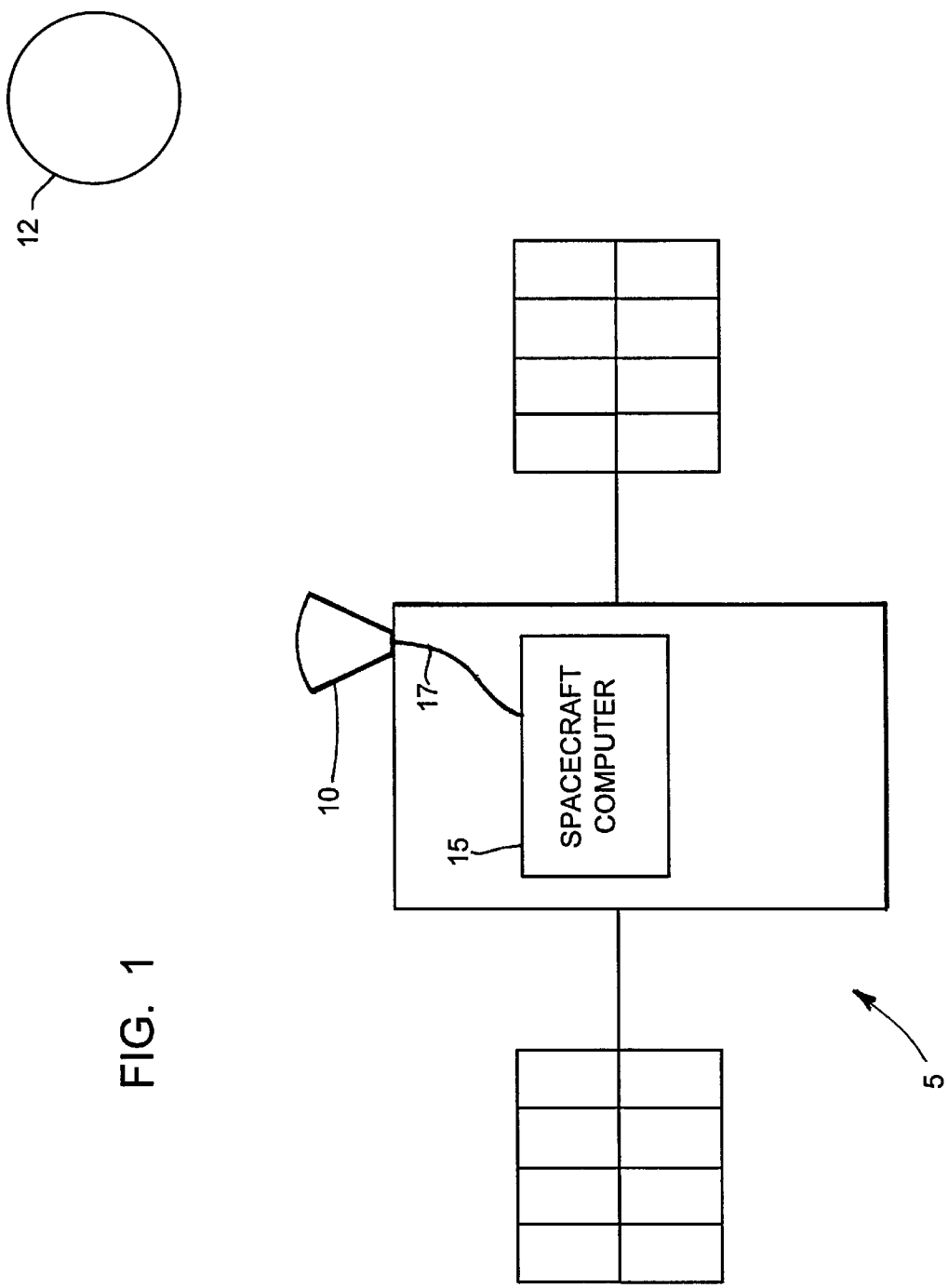
FIG. 1 is an illustration of an attitude determination system capable of utilizing the present invention.

The present invention relates to an architecture for interfacing a precision WFOV sun sensor to a processing unit. Referring now to FIG. 1, a spacecraft 5 is shown having, inter alia, a precision WFOV sun sensor 10, and a spacecraft computer 15. The spacecraft computer 15 is well known in the art, and may have various components providing various functions relevant to spacecraft functionality.

Typically, sun sensors 10 contain, within the sensor housing, processing electronics and photovoltaic cells disposed behind reticles. Alternatively, the sensor electronics may be housed in a dedicated electronics box, external from the sensor. In the disclosed embodiment of the present invention, the need for processing electronics either within the sensor housing or within an external box is eliminated by interface electronics disposed in the spacecraft computer. The precision WFOV sun sensor 10 outputs a number of current waveforms that represent the location of the sun 12. These current waveforms are coupled to the spacecraft computer 15 via an interface bus 17, which may be embodied as a connector and ribbon cable scheme. Typically, the current waveforms include both fine and coarse measurement signals, the fine signals having more precision than the coarse signals with respect to solar position representation. The fine and coarse signals are appropriately processed by the spacecraft computer to calculate spacecraft attitude.

Figure 2:
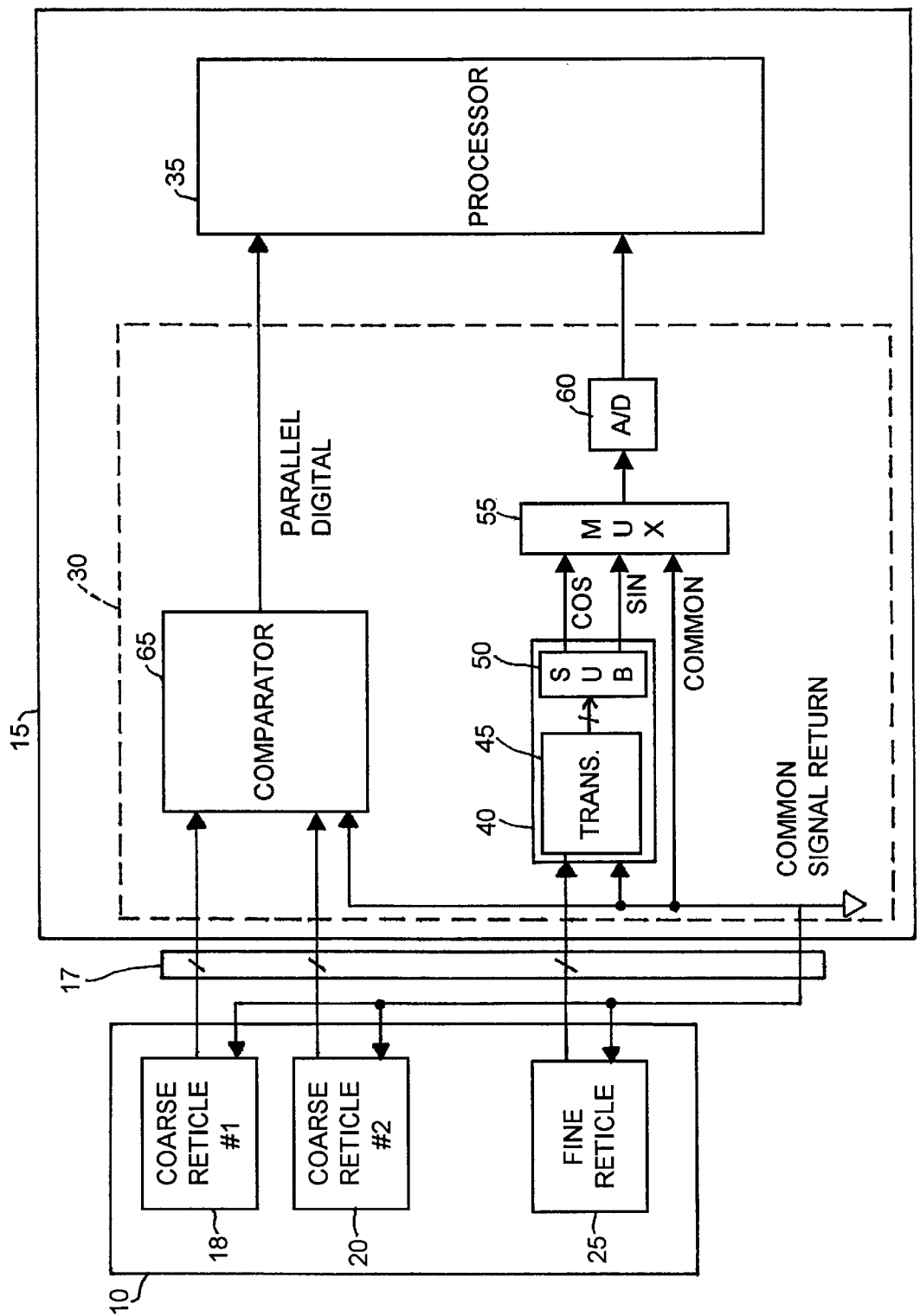
FIG. 2 is a detailed block diagram of the attitude determination system shown in FIG. 1.

FIG. 2 is a detailed block diagram representing the spacecraft computer 15 and a set of reticles 18, 20, 25 of a precision WFOV sun sensor 10. The spacecraft computer 15 includes, inter alia, sensor interface hardware 30 and a processor 35. Current signals from the reticles 18, 20, 25 are coupled, via the interface bus 17, to the precision WFOV sensor interface hardware 30 of the spacecraft computer 15.

The sensor interface hardware 30 processes both fine and coarse measurement signals for use by the processor 35. A fine interface circuit 40 processes the fine measurement signals. The fine interface circuit 40 includes transconductance amplifiers 45 and subtractors 50. The transconductance amplifiers 45 convert the analog currents from the precision WFOV sun sensor 10 into analog voltages. The subtractors 50 subtract selected analog voltages from one-another to create bi-polar, nominally zero biased signals. These analog voltage signals are then multiplexed by a multiplexer 55 and converted to digital signals by an analog to digital converter 60. The digital signals are provided to the processor 35 for processing.

The course measurement signals from the precision WFOV sun sensor 10 are compared against an automatically maintained threshold using a comparator 65, which determines the digital value represented by the currents. The output of the comparator 65 is a gray coded representation of solar position, which is coupled to the processor 35 as parallel digital data.

Signals from the precision WFOV sensor interface hardware 30 are passed to the processor 35 which determines the attitude of the spacecraft based on the information provided by the signals. The incorporation of the precision WFOV sensor interface hardware 30 into the spacecraft computer 15 offers many advantages. Specifically, the precision WFOV sensor interface hardware 30 represents only a small subset of the electronics used in dedicated external or on-sensor processing hardware. This hardware reduction is possible because software in the processor 35 may be used to replace the hardware functionality of either external or on-sensor processing hardware. Also, if a defect is found in software after the spacecraft is deployed, a software patch may be up uploaded to the spacecraft to fix the defect. However, a problem in dedicated external processing hardware is not easily fixed once the spacecraft is deployed. Additionally, the precision WFOV interface hardware 30 may be powered directly from the spacecraft computer 15, thereby eliminating power connections to dedicated external electronics or electronics housed within a sensor body. This configuration simplifies the precision WFOV sensor interconnection scheme with respect to power connections.

Of course, it should be understood that a range of changes and modifications can be made to the preferred embodiment described above. For example, the signals may be processed within the spacecraft computer without multiplexing, or the precision WFOV sun sensor currents may be converted to voltages before entering the spacecraft computer. It is therefore intended that the foregoing detailed description be regarded as illustrative rather than limiting and that it be understood that it is the following claims, including all equivalents, which are intended to define the scope of this invention.

What is claimed is:

1. An apparatus for sensing the position of the sun relative to a spacecraft, said apparatus comprising:

a wide-field-of-view (WFOV) optical sensor head located in said spacecraft, said WFOV optical sensor having at least one reticle, said WFOV optical sensor receiving an optical position of the sun relative to the spacecraft on at least one photovoltaic cell disposed behind each reticle, said WFOV optical sensor generating a sun position signal;

a spacecraft computer located in said spacecraft and separate from said WFOV optical sensor, said spacecraft computer including a microprocessor and a power supply;

a set of interface electronics integrated with said spacecraft computer and powered by said power supply, said set of interface electronics coupled to said WFOV optical sensor through an interface bus and receiving said sun position signal, wherein said set of interface electronics processes said sun position signal for use by said microprocessor.

2. The sensing apparatus of claim 1, wherein said WFOV optical sensor head includes at least one coarse reticle and at least one fine reticle, said WFOV optical sensor head generating at least one coarse analog current signal corresponding to each coarse reticle and at least one fine analog current signal corresponding to each fine reticle.

3. The sensing apparatus of claim 1, wherein said sun position signal is an analog current signal, said set of interface electronics converting said analog current signal into an analog voltage signal that is sampled to produce a digital signal.

4. The sensing apparatus of claim 1, wherein said WFOV optical sensor head requires no power connection.

* * * * *